United States Patent
Yanagi (10) Patent No.: US 11,333,248 B2
(45) Date of Patent: May 17, 2022

(54) POSITIVE/NEGATIVE PRESSURE GASKET

(71) Applicant: NOK CORPORATION, Tokyo (JP)

(72) Inventor: Tokunori Yanagi, Makinohara (JP)

(73) Assignee: NOK CORPORATION

( * ) Notice: Subject to any disclaimer, the term of this patent is extended or adjusted under 35 U.S.C. 154(b) by 208 days.

(21) Appl. No.: 16/500,720

(22) PCT Filed: Mar. 15, 2018

(86) PCT No.: PCT/JP2018/010151
§ 371 (c)(1),
(2) Date: Oct. 3, 2019

(87) PCT Pub. No.: WO2018/193766
PCT Pub. Date: Oct. 25, 2018

(65) Prior Publication Data
US 2020/0191273 A1  Jun. 18, 2020

(30) Foreign Application Priority Data
Apr. 19, 2017 (JP) ............................. JP2017-082695

(51) Int. Cl.
*F16J 15/12* (2006.01)
*F16J 15/02* (2006.01)
(Continued)

(52) U.S. Cl.
CPC ............ *F16J 15/121* (2013.01); *F16J 15/025* (2013.01); *F16J 15/061* (2013.01); *F16J 15/104* (2013.01)

(58) Field of Classification Search
CPC ........ F16J 15/025; F16J 15/061; F16J 15/062; F16J 15/104; F16J 15/121; F16J 15/125
See application file for complete search history.

(56) References Cited

U.S. PATENT DOCUMENTS 5,409,337 A * 4/1995 Muyskens .............. F16J 15/062
411/148
5,588,656 A * 12/1996 Matsushima ........ F16J 15/3268
277/575
(Continued)

FOREIGN PATENT DOCUMENTS

CN 1105430 A 7/1995
CN 2385156 Y 6/2000
(Continued)

OTHER PUBLICATIONS

Extended European Search Report dated Jan. 14, 2021 for European Patent Application No. 18787313.8 (41 pages).

*Primary Examiner* — Nicholas L Foster
(74) *Attorney, Agent, or Firm* — Harness, Dickey & Pierce, P.L.C.

(57) ABSTRACT

A gasket is configured to be mounted in a gasket mounting groove that opens to the radially inside of a mounting member provided with a hydraulic passage, and is provided with a back-side hydraulic passage serving as a gap on its groove bottom surface. The gasket includes a gasket body with a reinforcement ring buried therein and a flange provided to extend from one axial end of the gasket body toward the radially outside. The gasket also includes a one-end-side seal lip that is provided to extend from the one axial end of the gasket body toward one side in an axial direction and the radially inside, and is configured to come in contact with one axial side surface of the gasket mounting groove when the gasket body is mounted. The gasket also includes an other-end-side seal lip that is provided to extend from the other axial end of the gasket body toward the other side in the axial direction and the radially outside, and is configured to come in contact with the other axial side (Continued)

surface and a bottom surface of the gasket mounting groove when the gasket body is mounted.

12 Claims, 7 Drawing Sheets

(51) Int. Cl.
    *F16J 15/06*    (2006.01)
    *F16J 15/10*    (2006.01)

(56) References Cited

U.S. PATENT DOCUMENTS

| | | | |
|---|---|---|---|
| 6,702,293 B2 * | 3/2004 | Endo | F02F 11/002 |
| | | | 277/500 |
| 8,814,174 B2 * | 8/2014 | Okuda | F16L 23/22 |
| | | | 277/644 |
| 10,197,162 B2 * | 2/2019 | Yanagi | F16J 15/125 |
| 10,612,660 B2 * | 4/2020 | Yanagi | F16J 15/104 |
| 2008/0143053 A1 * | 6/2008 | Kanzaki | F16J 15/061 |
| | | | 277/345 |
| 2008/0251347 A1 * | 10/2008 | Watanabe | F16D 25/12 |
| | | | 192/85.01 |
| 2009/0032366 A1 | 2/2009 | Goto | |
| 2013/0106064 A1 * | 5/2013 | Okuda | F16J 15/122 |
| | | | 277/591 |
| 2017/0089465 A1 * | 3/2017 | Yanagi | F16J 15/125 |
| 2019/0032783 A1 * | 1/2019 | Yanagi | F16J 15/122 |
| 2021/0164570 A1 * | 6/2021 | Amano | F16J 15/121 |

FOREIGN PATENT DOCUMENTS

| | | |
|---|---|---|
| CN | 101002041 A | 7/2007 |
| CN | 203146815 U | 8/2013 |
| EP | 3412941 A1 | 12/2018 |
| GB | 853996 A | 11/1960 |
| JP | S62-34260 U | 2/1987 |
| JP | H01-261564 A | 10/1989 |
| JP | H05-47619 U | 6/1993 |
| JP | H06-032834 U | 4/1994 |
| JP | H10-26228 A | 1/1998 |
| JP | 2012-067790 A | 4/2012 |
| WO | WO-2012-005165 A1 | 1/2012 |

\* cited by examiner

POSITIVE/NEGATIVE PRESSURE GASKET

CROSS REFERENCE TO RELATED APPLICATIONS

This application is a U.S. National Phase application of International Application No. PCT/JP2018/010151, filed on Mar. 15, 2018 and published in Japanese as WO 2018/193766 on Oct. 25, 2018 and claims priority to Japanese Patent Application No. 2017-082695, filed on Apr. 19, 2017. The entire disclosures of the above applications are expressly incorporated by reference herein.

BACKGROUND

Technical Field

The disclosure relates to a positive/negative pressure gasket.

Related Art

Figure 7:
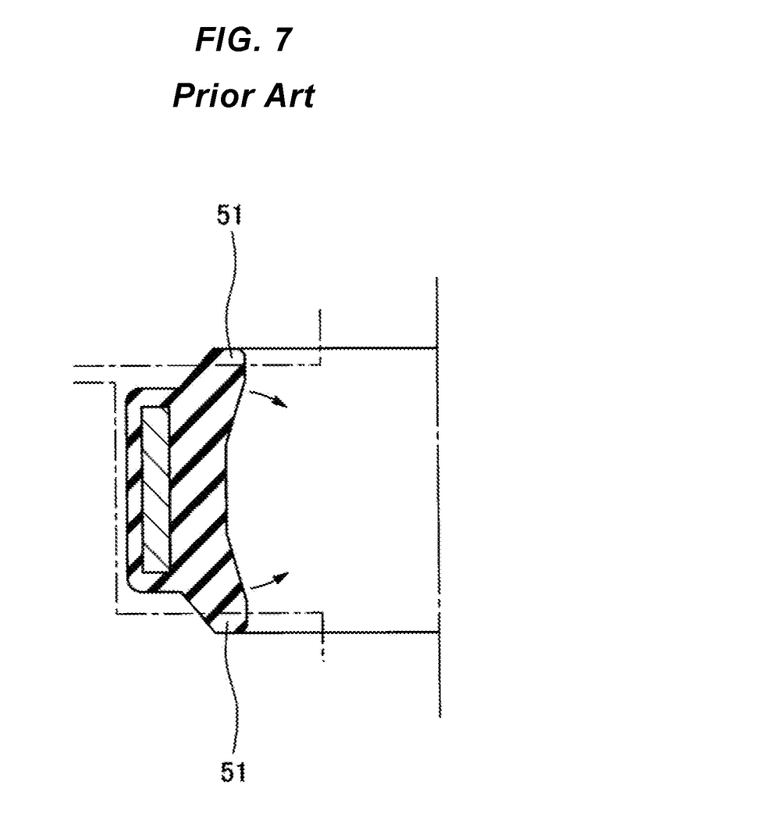
FIG. 7 is a cross-sectional view of a gasket according to the background art.

Oil passage gaskets used in the automobile-related field, the field of automobile accessories, the field of general industrial machineries, etc. include inward-slanting lips 51 as shown in FIG. 7 or outward-slanting lips (a case where respective inner and outer diameters of the inward-slanting lips are reversed, not shown) to ensure the pressure tightness. These inward-slanting lips 51 or outward-slanting lips basically have a seal design for one direction (a seal in the opposite direction is limited to low pressure).

Under a condition where both positive pressure and negative pressure are applied, with sufficient dimensional accuracy of a gasket mounting groove ensured, a seal design using, for example, an O-ring or an X-ring without seal directionality is adopted.

However, in recent years, there is a case where it fails to ensure the existing groove accuracy due to changes in material (from iron or aluminum to resin) to reduce weight, components becoming complex (accumulated tolerances of many components), reduction of processing on a molding surface, etc. In this case, in conventional design technologies, it is difficult to achieve both the mitigation of the groove accuracy and the sealing of both positive pressure and negative pressure.

It is desired to provide a gasket that makes it possible to ensure the sealing of both positive pressure and negative pressure even if the dimensional accuracy requirement of a gasket mounting groove is relaxed.

SUMMARY

An aspect of a positive/negative pressure gasket includes: an annular gasket body with a reinforcement ring buried therein, the gasket body configured to be mounted in a gasket mounting groove that opens in a radial direction of a mounting member and is provided with a gap on a groove bottom surface thereof; a flange that is provided to extend from one axial end of the gasket body toward a direction opposite to an opening direction of the mounting member; a one-end-side seal lip that is provided to extend from the one axial end of the gasket body toward one side in an axial direction and the opening direction of the mounting member, and is configured to come in contact with one axial side surface of the gasket mounting groove when the gasket body is mounted in the gasket mounting groove; and an other-end-side seal lip that is provided to extend from another axial end of the gasket body toward another side in the axial direction and the direction opposite to the opening direction of the mounting member, and is configured to come in contact with another axial side surface and a bottom surface of the gasket mounting groove when the gasket body is mounted in the gasket mounting groove.

Another aspect of the positive/negative pressure gasket includes: an annular gasket body with a reinforcement ring buried therein, the gasket body configured to be mounted in a gasket mounting groove that opens in a radial direction of a mounting member and is provided with a gap on a groove bottom surface thereof; a flange that is provided to extend from one axial end of the gasket body toward a direction opposite to an opening direction of the mounting member; a one-end-side seal lip that is provided to extend from the one axial end of the gasket body toward one side in an axial direction and the opening direction of the mounting member; a one-end-side sub seal lip that has a length dimension larger than an axial height dimension of the one-end-side seal lip, and is provided to extend from the flange toward the one side in the axial direction and the direction opposite to the opening direction of the mounting member; and an other-end-side seal lip that is provided to extend from another axial end of the gasket body toward another side in the axial direction and the direction opposite to the opening direction of the mounting member.

Effect

It is possible to ensure the sealing of both positive pressure and negative pressure even if the dimensional accuracy requirement of a gasket mounting groove is relaxed.

BRIEF DESCRIPTION OF THE DRAWINGS

FIGS. 1A and 1B are diagrams showing a gasket according to a first embodiment.

FIGS. 2A and 2B are diagrams showing a gasket according to a second embodiment.

FIGS. 3A and 3B are diagrams showing a gasket according to a third embodiment.

FIGS. 5A and 5B are diagrams showing a gasket according to a fourth embodiment.

DETAILED DESCRIPTION

First Embodiment

Figure 1A:
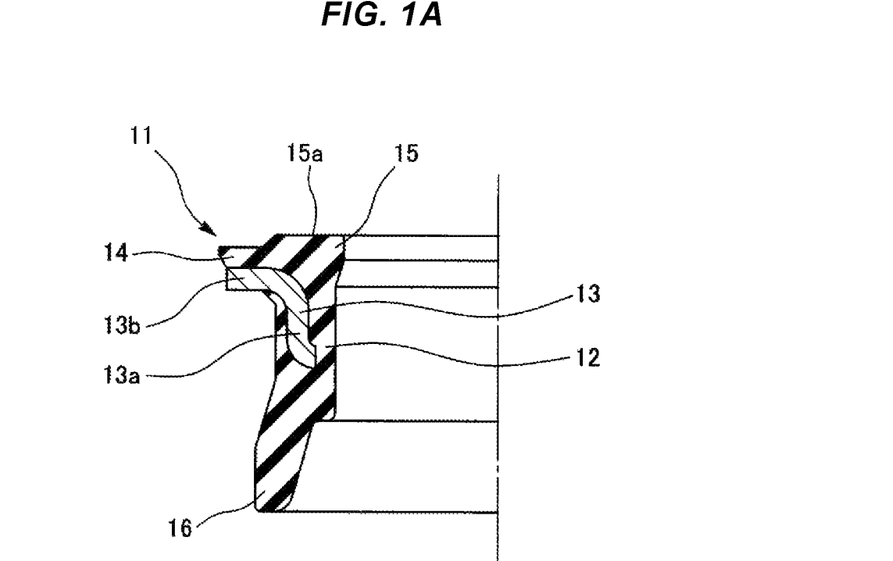
FIG. 1A is a half sectional view showing a state before the gasket is mounted.
Figure 1B:
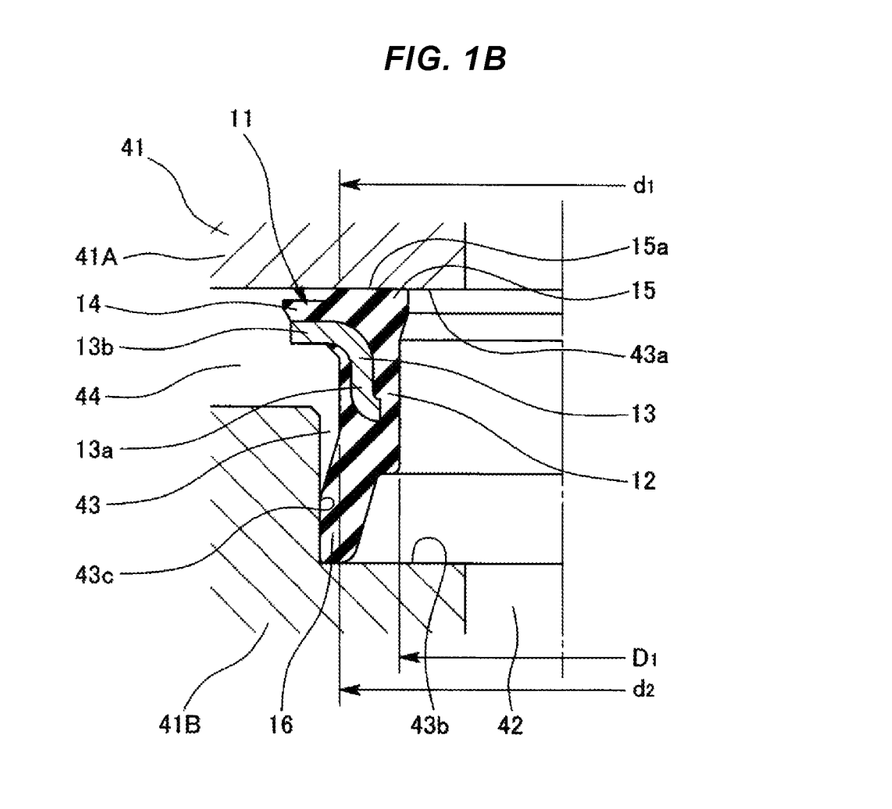
FIG. 1B is a half sectional view showing a state after the gasket is mounted.

FIGS. 1A and 1B show a half section of a gasket 11 according to a first embodiment. The gasket 11 according to the present embodiment is applied to a joint seal or the like in an automatic transmission (AT) of a vehicle such as an automobile, and is mounted in a gasket mounting groove 43 provided on an inner diameter portion of a mounting member 41 such as a housing or a flange that includes a hydraulic passage 42, and seals hydraulic pressure.

In the present embodiment, the hydraulic passage 42 is provided on the inner diameter side of the mounting member 41, and the gasket mounting groove 43 is provided on the inner diameter portion of the mounting member 41 so as to open toward this hydraulic passage 42. The mounting member 41 is divided into two in an axial direction at a position of one axial (in the drawing, upper) end of a bottom surface (a groove bottom surface) 43c of the gasket mounting groove 43, and is a combination of one mounting member 41A and the other mounting member 41B. A gap 44 in the axial direction is provided between the two mounting members 41A and 41B. The gap 44 serves as a back-side hydraulic passage with respect to the gasket 11. Therefore, the gasket 11 according to the present embodiment is mounted in the gasket mounting groove 43 that opens to the radially inside where the hydraulic passage 42 is present and is provided with the gap (the back-side hydraulic passage) 44 on its groove bottom surface.

As shown in FIG. 1A, a gasket body 12 of the gasket 11 is formed by burying a reinforcement ring 13 made of a rigid material such as metal in an annular body (a rubber annular body) including a predetermined rubber-like elastic body. This gasket body 12 having a rectangular shape in cross-section is integrally provided with a flange 14 extending from one axial (in the drawing, upper) end of the gasket body 12 toward the radially outside.

The reinforcement ring 13 is integrally provided with an annular flat portion 13b extending from one axial end of a tubular portion 13a toward the radially outside. The tubular portion 13a is buried in the gasket body 12 to make the gasket body 12 less likely to be deformed. The flat portion 13b is buried in the flange 14, or is disposed along an axial end surface of the flange 14. In either case, this flat portion 13b supports the flange 14, and thus the flange 14 is less likely to be deformed.

The gasket body 12 is integrally provided with an annular one-end-side seal lip 15 extending obliquely from the one axial end of the gasket body 12 toward one side in the axial direction and the radially inside.

The gasket body 12 is integrally provided with an annular other-end-side seal lip 16 extending obliquely from the other axial (in the drawing, lower) end of the gasket body 12 toward the other side in the axial direction and the radially outside.

As shown in FIG. 1B, the gasket 11 is mounted in the annular gasket mounting groove 43 provided on the inner diameter portion of the mounting member 41. The gasket mounting groove 43 has a rectangular shape in cross-section, and opens to the radially inside. The mounting member 41 is divided into two in the axial direction at the position of the one axial end of the bottom surface 43c of the mounting groove 43, and is a combination of the one mounting member 41A and the other mounting member 41B. The gap 44 in the axial direction is provided between the two mounting members 41A and 41B, and an outer diameter dimension of the flange 14 is set to be larger than a diameter dimension of the bottom surface 43c of the mounting groove 43; therefore, when the gasket 11 is mounted in the mounting groove 43, at least a part on outer-diameter side of the flange 14 is housed in the gap 44.

When the gasket 11 is mounted in the mounting groove 43, a contact portion 15a that is a lip tip of the one-end-side seal lip 15 comes in contact with one axial side surface 43a of the mounting groove 43. The contact portion 15a has a predetermined width in a radial direction. While in a mounted state, an outer diameter dimension d1 of the contact portion 15a of the one-end-side seal lip 15 is set to be equal to an outer diameter dimension d2 of the base of the flange 14 (an outer diameter dimension of the gasket body 12) (d1=d2), and thus the pressures acting on both sides of the flange 14 in the axial direction cancel each other. When the gasket 11 is mounted in the mounting groove 43, the other-end-side seal lip 16 comes in contact with the other axial side surface 43b and the bottom surface 43c of the mounting groove 43.

Positive pressure acts on the gasket 11 from its inner diameter side, and thus the gasket 11 receives this inner-diameter-side positive pressure and seals this pressure. At this time, the outer diameter side of the gasket 11 (the side of the gap 44) is under negative pressure. Hereinafter, this state is referred to also as "under positive pressure".

Positive pressure may sometimes act on the gasket 11 from its outer diameter side (the side of the gap 44), and thus the gasket 11 receives this outer-diameter-side positive pressure and seals this pressure. At this time, the inner diameter side of the gasket 11 is under negative pressure. Hereinafter, this state is referred to also as "under negative pressure".

Under positive pressure, the one-end-side seal lip 15 is subjected to the positive pressure from the inner diameter side of the gasket 11 and is pressed against the one axial side surface 43a of the mounting groove 43, and the other-end-side seal lip 16 is pressed against the bottom surface 43c of the mounting groove 43, and thus the sealing is ensured.

Under negative pressure, the other-end-side seal lip 16 is subjected to the positive pressure from the outer diameter side of the gasket 11 and is deformed to rise (is deformed in a direction that makes the angle of inclination to a gasket center axis line smaller), thus the entire gasket 11 is displaced to the one side in the axial direction, and the one-end-side seal lip 15 is pressed hard against the one axial side surface 43a of the mounting groove 43. Therefore, the other-end-side seal lip 16 is pressed against the other axial side surface 43b of the mounting groove 43, and the one-end-side seal lip 15 is pressed hard against the one axial side surface 43a of the mounting groove 43, and thus the sealing is ensured.

Therefore, whether the inner diameter side of the gasket 11 is under positive pressure or negative pressure, the sealing can be ensured, and thus it is possible to ensure the sealing of both positive pressure and negative pressure even if the dimensional accuracy requirement of the gasket mounting groove 43 is relaxed.

The outer diameter dimension d1 of the contact portion 15a of the one-end-side seal lip 15 is set to be equal to the outer diameter dimension d2 of the base of the flange 14 (d1=d2), and thus the pressures acting on the both sides of the flange 14 in the axial direction cancel each other. Therefore, the entire gasket 11 is not displaced to the one side or the other side in the axial direction by the pressures acting on the flange 14 provided to reinforce the gasket body 12, and thus it is possible to prevent the occurrence of a situation where contact surface pressure of the one-end-side seal lip 15 applied to the side surface 43a of the mounting groove 43 is reduced, which reduces the sealing or a situation where contact surface pressure of the other-end-side seal lip 16 applied to the side surface 43b of the mounting groove 43 is reduced, which reduces the sealing.

As for the above-described radial dimensional data, as described above, d1=d2 in a mounted state is preferred; however, it is not limited to this, and may be d1>d2. To the contrary, if the displacement of the entire gasket 11 to the other side in the axial direction is within a small amount range, it may be d1<d2. The outer diameter dimension d1 of the contact portion 15a of the one-end-side seal lip 15 in a mounted state only has to at least be larger than an inner diameter dimension D1 of the gasket body 12 (d1>D1).

As another aspect of the present embodiment, for example, to prevent the gasket 11 from coming off the gasket mounting groove 43, an interference may be given to the outer periphery of the other-end-side seal lip 16.

Second Embodiment

The arrangement of components of the gasket 11 according to the above-described first embodiment may be inverted in the radial direction. An aspect of this inversion is described as a second embodiment.

Figure 2A:
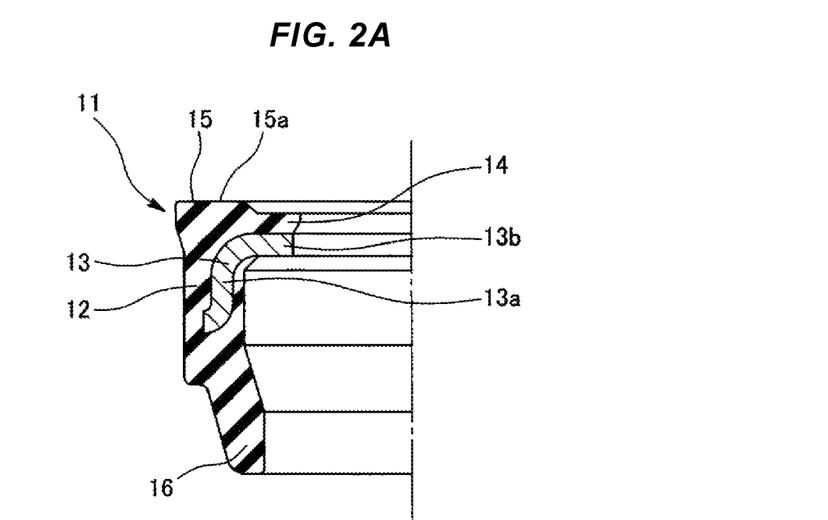
FIG. 2A is a half sectional view showing a state before the gasket is mounted.
Figure 2B:
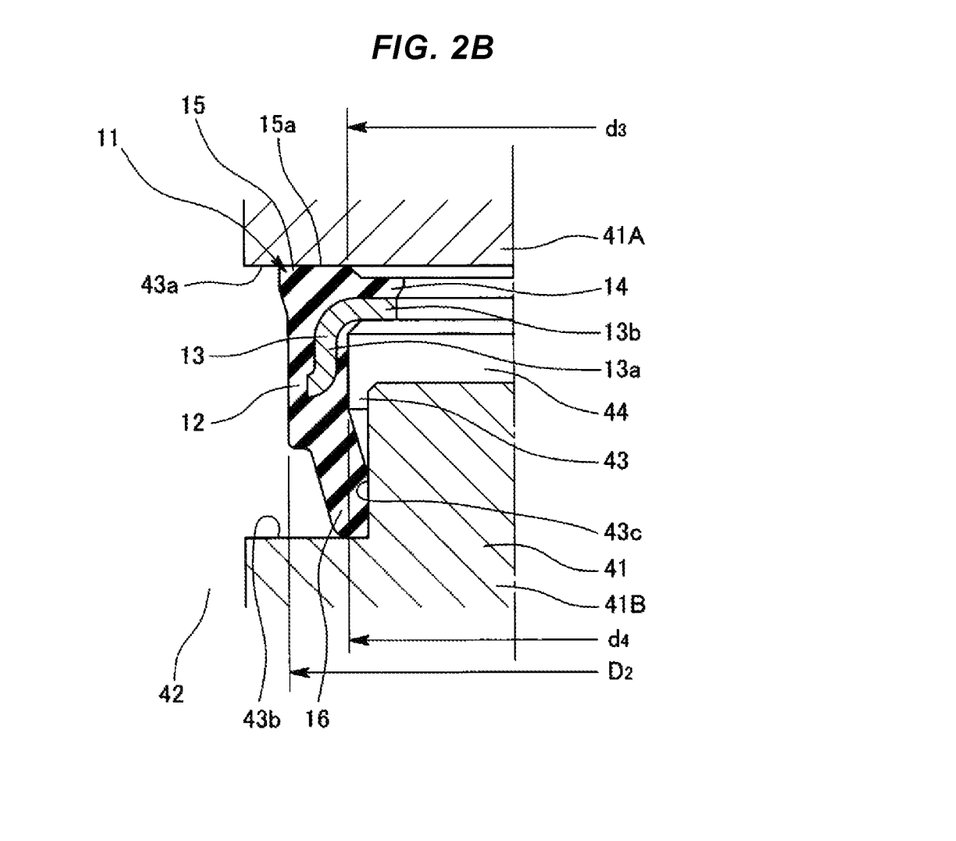
FIG. 2B is a half sectional view showing a state after the gasket is mounted.

FIGS. 2A and 2B show a half section of the gasket 11 according to the second embodiment. The gasket 11 according to the present embodiment is applied to a joint seal or the like in an automatic transmission (AT) of a vehicle such as an automobile, and is mounted in the gasket mounting groove 43 provided on an outer diameter portion of the mounting member 41 such as a housing or a flange that includes the hydraulic passage 42, and seals hydraulic pressure.

In the present embodiment, the hydraulic passage 42 is provided on the outer diameter side of the mounting member 41, and the gasket mounting groove 43 is provided on the outer diameter portion of the mounting member 41 so as to open toward this hydraulic passage 42. Furthermore, the mounting member 41 is divided into two in the axial direction at the position of the one axial (in the drawing, upper) end of the bottom surface (the groove bottom surface) 43c of the gasket mounting groove 43, and is a combination of the one mounting member 41A and the other mounting member 41B. The gap 44 in the axial direction is provided between the two mounting members 41A and 41B. The gap 44 serves as a back-side hydraulic passage with respect to the gasket 11. Therefore, the gasket 11 according to this embodiment is mounted in the gasket mounting groove 43 that opens to the radially outside where the hydraulic passage 42 is present and is provided with the gap (the back-side hydraulic passage) 44 on its groove bottom surface.

As shown in FIG. 2A, the gasket body 12 of the gasket 11 is formed by burying the reinforcement ring 13 made of a rigid material such as metal in an annular body (a rubber annular body) including a predetermined rubber-like elastic body, and this gasket body 12 having a rectangular shape in cross-section is integrally provided with the flange 14 extending from the one axial (in the drawing, upper) end of the gasket body 12 toward the radially inside.

The reinforcement ring 13 is integrally provided with the annular flat portion 13b extending from the one axial end of the tubular portion 13a toward the radially inside. The tubular portion 13a is buried in the gasket body 12 to make the gasket body 12 less likely to be deformed. The flat portion 13b is buried in the flange 14, or is disposed along the axial end surface of the flange 14. In either case, this flat portion 13b supports the flange 14, and thus the flange 14 is less likely to be deformed.

The gasket body 12 is integrally provided with the annular one-end-side seal lip 15 extending obliquely from the one axial end of the gasket body 12 toward the one side in the axial direction and the radially outside.

The gasket body 12 is integrally provided with the annular other-end-side seal lip 16 extending obliquely from the other axial (in the drawing, lower) end of the gasket body 12 toward the other side in the axial direction and the radially inside.

As shown in FIG. 2B, the gasket 11 is mounted in the annular gasket mounting groove 43 provided on the outer diameter portion of the mounting member 41. The gasket mounting groove 43 has a rectangular shape in cross-section, and opens to the radially outside. The mounting member 41 is divided into two in the axial direction at the position of the one axial end of the bottom surface 43c of the mounting groove 43, and is a combination of the one mounting member 41A and the other mounting member 41B. The gap 44 in the axial direction is provided between the two mounting members 41A and 41B, and an inner diameter dimension of the flange 14 is set to be smaller than the diameter dimension of the bottom surface 43c of the mounting groove 43; therefore, when the gasket 11 is mounted in the mounting groove 43, at least a part on outer-diameter side of the flange 14 is housed in the gap 44.

When the gasket 11 is mounted in the mounting groove 43, the contact portion 15a that is the lip tip of the one-end-side seal lip 15 comes in contact with the one axial side surface 43a of the mounting groove 43. The contact portion 15a has a predetermined width in the radial direction. While in a mounted state, an inner diameter dimension d3 of the contact portion 15a of the one-end-side seal lip 15 is set to be equal to an inner diameter dimension d4 of the base of the flange 14 (an inner diameter dimension of the gasket body 12) (d3=d4), and thus the pressures acting on the both sides of the flange 14 in the axial direction cancel each other. Furthermore, when the gasket 11 is mounted in the mounting groove 43, the other-end-side seal lip 16 comes in contact with the other axial side surface 43b and the bottom surface 43c of the mounting groove 43.

Positive pressure acts on the gasket 11 from its outer diameter side, and thus the gasket 11 receives this outer-diameter-side positive pressure and seals this pressure. At this time, the inner diameter side of the gasket 11 (the side of the gap 44) is under negative pressure. Hereinafter, this state is referred to also as "under positive pressure".

Positive pressure may sometimes act on the gasket 11 from its inner diameter side (the side of the gap 44), and thus the gasket 11 receives this inner-diameter-side positive pressure and seals this pressure. At this time, the outer diameter side of the gasket 11 is under negative pressure. Hereinafter, this state is referred to also as "under negative pressure".

Under positive pressure, the one-end-side seal lip 15 is subjected to the positive pressure from the outer diameter side of the gasket 11 and is pressed against the one axial side surface 43a of the mounting groove 43, and the other-end-side seal lip 16 is pressed against the bottom surface 43c of the mounting groove 43, and thus the sealing is ensured.

Under negative pressure, the other-end-side seal lip 16 is subjected to the positive pressure from the inner diameter side of the gasket 11 and is deformed to rise (is deformed in the direction that makes the angle of inclination to the gasket center axis line smaller), thus the entire gasket 11 is displaced to the one side in the axial direction, and the one-end-side seal lip 15 is pressed hard against the one axial side surface 43a of the mounting groove 43. Therefore, the other-end-side seal lip 16 is pressed against the other axial side surface 43b of the mounting groove 43, and the one-end-side seal lip 15 is pressed hard against the one axial side surface 43a of the mounting groove 43, and thus the sealing is ensured.

Therefore, whether the outer diameter side of the gasket 11 is under positive pressure or negative pressure, the sealing can be ensured, thus it is possible to ensure the sealing of both positive pressure and negative pressure even if the dimensional accuracy requirement of the gasket mounting groove 43 is relaxed.

The inner diameter dimension d3 of the contact portion 15a of the one-end-side seal lip 15 is set to be equal to the inner diameter dimension d4 of the base of the flange 14 (d3=d4), and thus the pressures acting on the both sides of the flange 14 in the axial direction cancel each other. Therefore, the entire gasket 11 is not displaced to the one side or the other side in the axial direction by the pressures acting on the flange 14 provided to reinforce the gasket body 12, and thus it is possible to prevent the occurrence of a situation where contact surface pressure of the one-end-side seal lip 15 applied to the side surface 43a of the mounting groove 43 is reduced, which reduces the sealing or a situation where contact surface pressure of the other-end-side seal lip 16 applied to the side surface 43b of the mounting groove 43 is reduced, which reduces the sealing.

As for the above-described radial dimensional data, as described above, d3=d4 in a mounted state is preferred; however, it is not limited to this, and may be d3<d4. To the contrary, if the displacement of the entire gasket 11 to the other side in the axial direction is within a small amount range, it may be d3>d4. The inner diameter dimension d3 of the contact portion 15a of the one-end-side seal lip 15 in a mounted state only has to at least be smaller than an outer diameter dimension D2 of the gasket body 12 (d3<D2).

As another aspect of the present embodiment, for example, to prevent the gasket 11 from coming off the gasket mounting groove 43, an interference may be given to the outer periphery of the other-end-side seal lip 16.

Third Embodiment

Figure 3A:
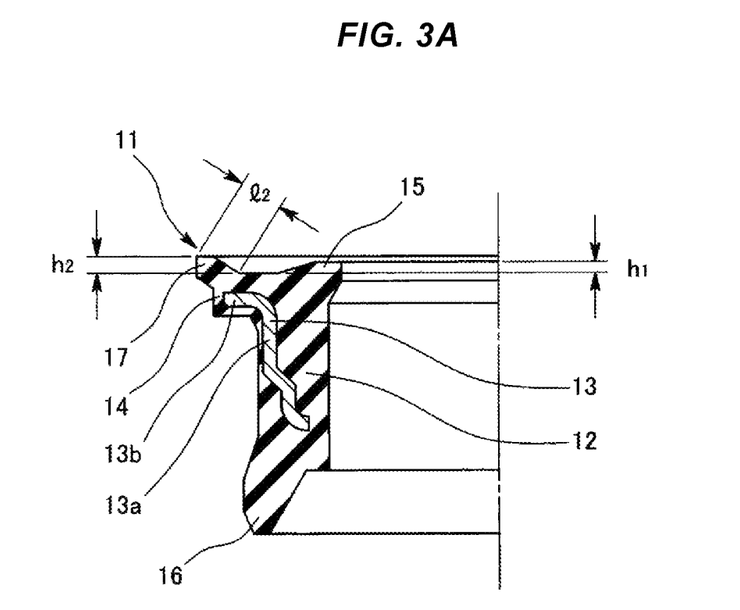
FIG. 3A is a half sectional view showing a state before the gasket is mounted.
Figure 3B:
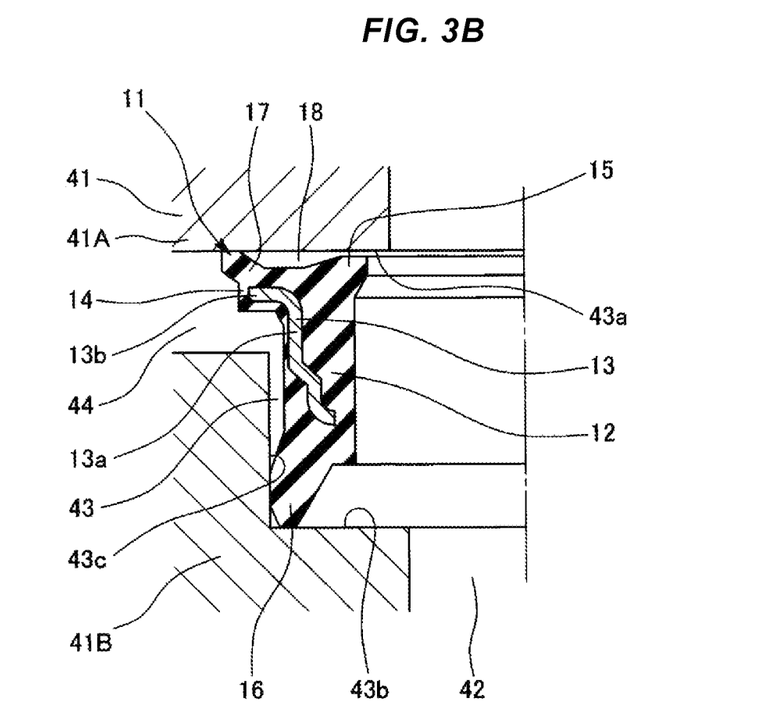
FIG. 3B is a half sectional view showing a state after the gasket is mounted.
Figure 4:
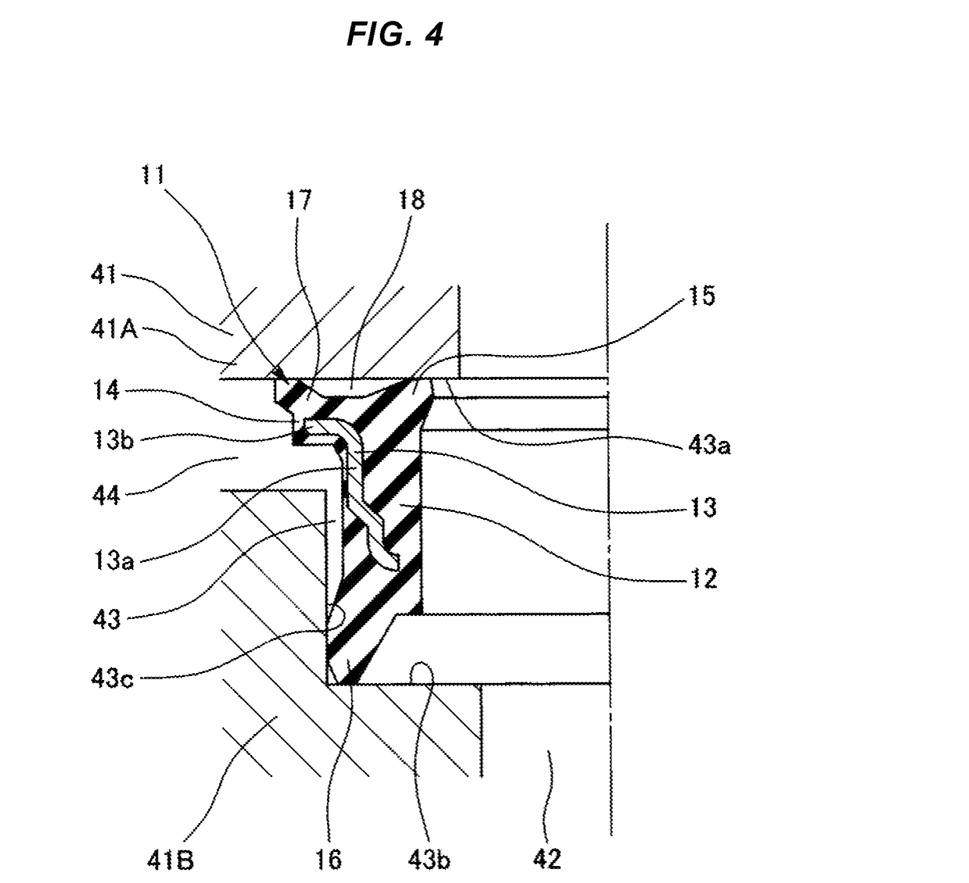
FIG. 4 is a diagram showing the gasket according to the third embodiment, and is a half sectional view showing a state where positive pressure is applied to the gasket from the inner diameter side.

FIGS. 3A, 3B, and 4 show a half section of the gasket 11 according to a third embodiment. The gasket 11 according to the present embodiment is applied to a joint seal or the like in an automatic transmission (AT) of a vehicle such as an automobile, and is mounted in the gasket mounting groove 43 provided on the inner diameter portion of the mounting member 41 that includes the hydraulic passage 42, and seals hydraulic pressure.

In the present embodiment, the hydraulic passage 42 is provided on the inner diameter side of the mounting member 41, and the gasket mounting groove 43 is provided on the inner diameter portion of the mounting member 41 so as to open toward this hydraulic passage 42. Furthermore, the mounting member 41 is divided into two in the axial direction at the position of the one axial (in the drawing, upper) end of the bottom surface (the groove bottom surface) 43c of the gasket mounting groove 43, and is a combination of the one mounting member 41A and the other mounting member 41B. The gap 44 in the axial direction is provided between the two mounting members 41A and 41B. The gap 44 serves as a back-side hydraulic passage with respect to the gasket 11. Therefore, the gasket 11 according to this embodiment is mounted in the gasket mounting groove 43 that opens to the radially inside where the hydraulic passage 42 is present and is provided with the gap (the back-side hydraulic passage) 44 on its groove bottom surface.

As shown in FIG. 3A, the gasket body 12 of the gasket 11 is formed by burying the reinforcement ring 13 made of a rigid material such as metal in an annular body (a rubber annular body) including a predetermined rubber-like elastic body, and this gasket body 12 having a rectangular shape in cross-section is integrally provided with the flange 14 extending from the one axial (in the drawing, upper) end of the gasket body 12 toward the radially outside.

The reinforcement ring 13 is integrally provided with the annular flat portion 13b extending from the one axial end of the tubular portion 13a toward the radially outside. The tubular portion 13a is buried in the gasket body 12 to make the gasket body 12 less likely to be deformed. The flat portion 13b is buried in the flange 14, or is disposed along the axial end surface of the flange 14. In either case, this flat portion 13b supports the flange 14, and thus the flange 14 is less likely to be deformed.

The gasket body 12 is integrally provided with the annular one-end-side seal lip 15 extending obliquely from the one axial end of the gasket body 12 toward the one side in the axial direction and the radially inside.

The flange 14 is integrally provided with an annular one-end-side sub seal lip 17 extending from the flange 14 toward the one side in the axial direction and the radially outside.

The gasket body 12 is integrally provided with the annular other-end-side seal lip 16 extending obliquely from the other axial (in the drawing, lower) end of the gasket body 12 toward the other side in the axial direction and the radially outside.

An axial height dimension h1 of the one-end-side seal lip 15 is set to be smaller than a length dimension l2 of the one-end-side sub seal lip 17. In other words, the length dimension l2 of the one-end-side sub seal lip 17 is set to be larger than the axial height dimension h1 of the one-end-side seal lip 15 (h1<l2).

Preferably, the axial height dimension h1 of the one-end-side seal lip 15 in a free state before mounting of the gasket 11 is set to be smaller than a height dimension h2 of the one-end-side sub seal lip 17. In other words, the axial height dimension h2 of the one-end-side sub seal lip 17 is set to be larger than the axial height dimension h1 of the one-end-side seal lip 15 (h1<h2).

As shown in FIG. 3B, the gasket 11 is mounted in the annular gasket mounting groove 43 provided on the inner diameter portion of the mounting member 41. The gasket mounting groove 43 has a rectangular shape in cross-section, and opens to the radially inside. The mounting member 41 is divided into two in the axial direction at the position of the one axial end of the bottom surface 43c of the mounting groove 43, and is a combination of the one mounting member 41A and the other mounting member 41B. The gap 44 in the axial direction is provided between the two mounting members 41A and 41B. Respective outer diameter dimensions of the flange 14 and the one-end-side sub seal lip 17 are set to be larger than the diameter dimension of the bottom surface 43c of the mounting groove 43; therefore, when the gasket 11 is mounted in the mounting groove 43, at least a part of the flange 14 and the one-end-side sub seal lip 17 is housed in the gap 44.

When the gasket 11 is mounted in the mounting groove 43, the one-end-side sub seal lip 17 comes in contact with the one axial side surface 43a of the mounting groove 43.

Depending on a groove width of the mounting groove 43, the one-end-side seal lip 15 forms a clearance between the one-end-side seal lip 15 and the one axial side surface 43a of the mounting groove 43. The other-end-side seal lip 16 comes in contact with the other axial side surface 43b and the bottom surface 43c of the mounting groove 43 at the same time.

Positive pressure acts on the gasket 11 from its inner diameter side, and thus the gasket 11 receives this inner-diameter-side positive pressure and seals this pressure. At this time, the outer diameter side of the gasket 11 (the side of the gap 44) is under negative pressure. Hereinafter, this state is referred to also as "under positive pressure".

Positive pressure may sometimes act on the gasket 11 from its outer diameter side (the side of the gap 44), and thus the gasket 11 receives this outer-diameter-side positive pressure and seals this pressure. At this time, the inner diameter side of the gasket 11 is under negative pressure. Hereinafter, this state is referred to also as "under negative pressure".

Under positive pressure, as shown in FIG. 4, the one-end-side seal lip 15 is subjected to the positive pressure from the inner diameter side of the gasket 11 and is pressed against the one axial side surface 43a of the mounting groove 43, and the other-end-side seal lip 16 is pressed against the bottom surface 43c of the mounting groove 43, thus the sealing is ensured.

When the gasket 11 has made transition from the state shown in FIG. 4 to the state under negative pressure, since a space 18 between the one-end-side seal lip 15 and the one-end-side sub seal lip 17 is sealed, this space 18 is under positive pressure, and thus, if pressure is applied, the entire gasket 11 is displaced to the other side in the axial direction. The length dimension l2 of the one-end-side sub seal lip 17 is set to be larger than the axial height dimension h1 of the one-end-side seal lip 15, and thus, if the entire gasket 11 is displaced to the other side in the axial direction, the one-end-side seal lip 15 moves away from the one axial side surface 43a of the mounting groove 43 as shown in FIG. 3B, and thereby the space 18 becomes under negative pressure. Therefore, positive pressure acts on the other axial end surface of the flange 14, thereby the entire gasket 11 is displaced to the one side in the axial direction, and the one-end-side sub seal lip 17 is pressed against the one axial side surface 43a of the mounting groove 43 (an end surface of the one mounting member 41A), and thus the sealing is ensured.

Therefore, whether the inner diameter side of the gasket 11 is under positive pressure or negative pressure, the sealing can be ensured, and thus it is possible to ensure the sealing of both positive pressure and negative pressure even if the dimensional accuracy requirement of the gasket mounting groove 43 is relaxed.

As another aspect of the present embodiment, for example, to prevent the gasket 11 from coming off the gasket mounting groove 43, an interference may be given to the outer periphery of the other-end-side seal lip 16.

Fourth Embodiment

The arrangement of components of the gasket 11 according to the third embodiment may be inverted in the radial direction. An aspect of this inversion is described as a fourth embodiment.

Figure 5A:
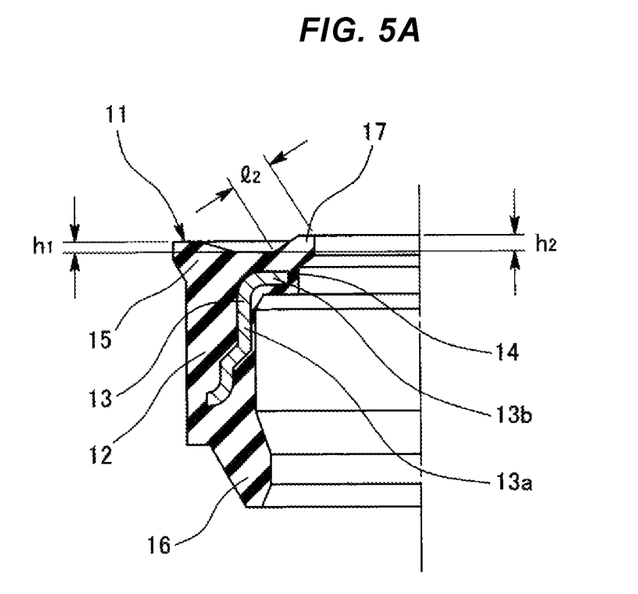
FIG. 5A is a half sectional view showing a state before the gasket is mounted.
Figure 5B:
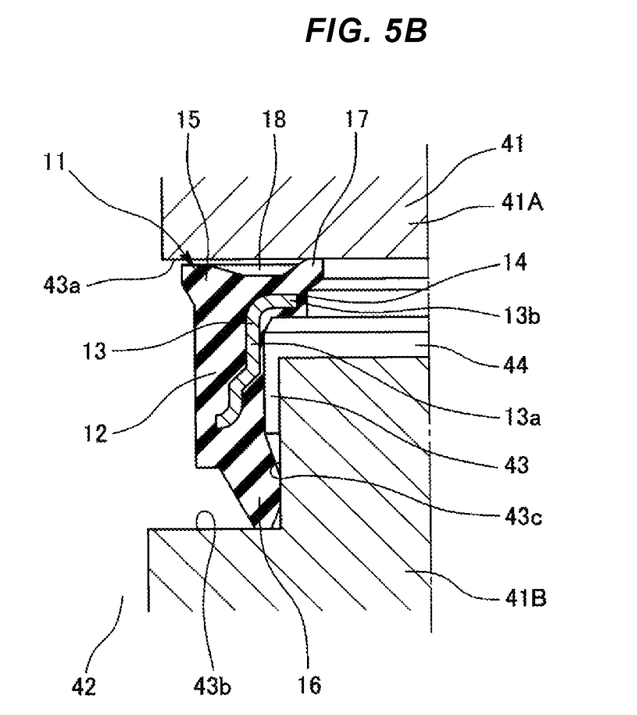
FIG. 5B is a half sectional view showing a state after the gasket is mounted.
Figure 6:
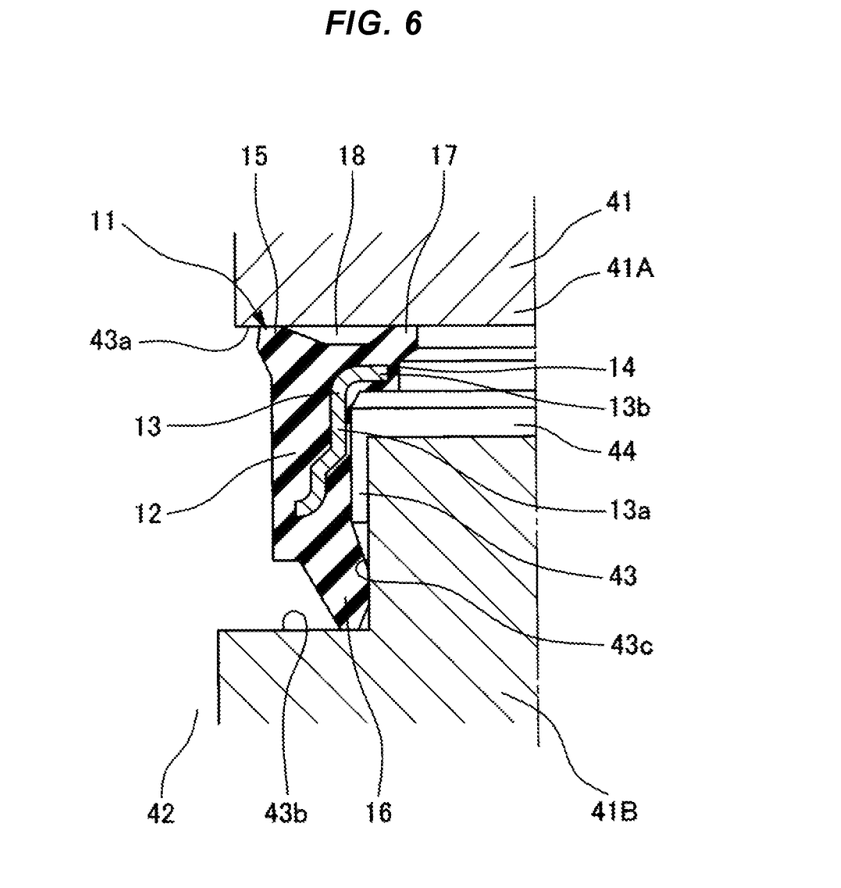
FIG. 6 is a diagram showing the gasket according to the fourth embodiment, and is a half sectional view showing a state where positive pressure is applied to the gasket from the outer diameter side.

FIGS. 5A, 5B, and 6 show a half section of the gasket 11 according to the fourth embodiment. The gasket 11 according to the present embodiment is applied to a joint seal or the like in an automatic transmission (AT) of a vehicle such as an automobile, and is mounted in the gasket mounting groove 43 provided on the inner diameter portion of the mounting member 41 that includes the hydraulic passage 42, and seals hydraulic pressure.

In the present embodiment, the hydraulic passage 42 is provided on the outer diameter side of the mounting member 41, and the gasket mounting groove 43 is provided on the outer diameter portion of the mounting member 41 so as to open toward this hydraulic passage 42. Furthermore, the mounting member 41 is divided into two in the axial direction at the position of the one axial (in the drawing, upper) end of the bottom surface (the groove bottom surface) 43c of the gasket mounting groove 43, and is a combination of the one mounting member 41A and the other mounting member 41B. The gap 44 in the axial direction is provided between the two mounting members 41A and 41B. The gap 44 serves as a back-side hydraulic passage with respect to the gasket 11. Therefore, the gasket 11 according to this embodiment is mounted in the gasket mounting groove 43 that opens to the radially outside where the hydraulic passage 42 is present and is provided with the gap (the back-side hydraulic passage) 44 on its groove bottom surface.

That is, as shown in FIG. 5A, the gasket body 12 of the gasket 11 is formed by burying the reinforcement ring 13 made of a rigid material such as metal in an annular body (a rubber annular body) including a predetermined rubber-like elastic body, and this gasket body 12 having a rectangular shape in cross-section is integrally provided with the flange 14 extending from the one axial (in the drawing, upper) end of the gasket body 12 toward the radially inside.

The reinforcement ring 13 is integrally provided with the annular flat portion 13b extending from the one axial end of the tubular portion 13a toward the radially inside. The tubular portion 13a is buried in the gasket body 12 to make the gasket body 12 less likely to be deformed. The flat portion 13b is buried in the flange 14, or is disposed along the axial end surface of the flange 14. In either case, this flat portion 13b supports the flange 14, and thus the flange 14 is less likely to be deformed.

The gasket body 12 is integrally provided with the annular one-end-side seal lip 15 extending obliquely from the one axial end of the gasket body 12 toward the one side in the axial direction and the radially outside.

The flange 14 is integrally provided with the annular one-end-side sub seal lip 17 extending obliquely from the flange 14 toward the one side in the axial direction and the radially inside.

The gasket body 12 is integrally provided with the annular other-end-side seal lip 16 extending obliquely from the other axial (in the drawing, lower) end of the gasket body 12 toward the other side in the axial direction and the radially inside.

The axial height dimension h1 of the one-end-side seal lip 15 is set to be smaller than the length dimension l2 of the one-end-side sub seal lip 17. In other words, the length dimension l2 of the one-end-side sub seal lip 17 is set to be larger than the axial height dimension h1 of the one-end-side seal lip 15 (h1<l2).

Furthermore, preferably, the axial height dimension h1 of the one-end-side seal lip 15 in a free state before mounting of the gasket 11 is set to be smaller than the height dimension h2 of the one-end-side sub seal lip 17; in other words, the axial height dimension h2 of the one-end-side sub seal lip 17 is set to be larger than the axial height dimension h1 of the one-end-side seal lip 15 (h1<h2).

As shown in FIG. 5B, the gasket 11 is mounted in the annular gasket mounting groove 43 provided on the outer diameter portion of the mounting member 41 such as a housing. The gasket mounting groove 43 has a rectangular shape in cross-section, and opens to the radially outside. The mounting member 41 is divided into two in the axial direction at the position of the one axial end of the bottom surface 43c of the mounting groove 43, and is a combination of the one mounting member 41A and the other mounting member 41B. The gap 44 in the axial direction is provided between the two mounting members 41A and 41B, and respective inner diameter dimensions of the flange 14 and the one-end-side sub seal lip 17 are set to be smaller than the diameter dimension of the bottom surface 43c of the mounting groove 43; therefore, when the gasket 11 is mounted in the mounting groove 43, at least a part of the flange 14 and the one-end-side sub seal lip 17 is housed in the gap 44.

When the gasket 11 is mounted in the mounting groove 43, the one-end-side sub seal lip 17 comes in contact with the one axial side surface 43a of the mounting groove 43. Depending on a groove width of the mounting groove 43, the one-end-side seal lip 15 forms a clearance between the one-end-side seal lip 15 and the one axial side surface 43a of the mounting groove 43. The other-end-side seal lip 16 comes in contact with the other axial side surface 43b and the bottom surface 43c of the mounting groove 43.

Positive pressure acts on the gasket 11 from its outer diameter side, and thus the gasket 11 receives this outer-diameter-side positive pressure and seals this pressure. At this time, the inner diameter side of the gasket 11 (the side of the gap 44) is under negative pressure. Hereinafter, this state is referred to also as "under positive pressure".

Positive pressure may sometimes act on the gasket 11 from its inner diameter side (the side of the gap 44), and thus the gasket 11 receives this inner-diameter-side positive pressure and seals this pressure. At this time, the outer diameter side of the gasket 11 is under negative pressure. Hereinafter, this state is referred to also as "under negative pressure".

Under positive pressure, as shown in FIG. 6, the one-end-side seal lip 15 is subjected to the positive pressure from the outer diameter side of the gasket 11 and is pressed against the one axial side surface 43a of the mounting groove 43, and the other-end-side seal lip 16 is pressed against the bottom surface 43c of the mounting groove 43, and thus the sealing is ensured.

When the gasket 11 has made transition from the state shown in FIG. 6 to the state under negative pressure, since the space 18 between the one-end-side seal lip 15 and the one-end-side sub seal lip 17 is sealed, this space 18 is under positive pressure, and thus, if pressure is applied, the entire gasket 11 is displaced to the other side in the axial direction. The length dimension l2 of the one-end-side sub seal lip 17 is set to be larger than the axial height dimension h1 of the one-end-side seal lip 15, and thus, if the entire gasket 11 is displaced to the other side in the axial direction, the one-end-side seal lip 15 moves away from the one axial side surface 43a of the mounting groove 43 as shown in FIG. 5B, and thereby the space 18 becomes under negative pressure. Therefore, positive pressure acts on the other axial end surface of the flange 14, thereby the entire gasket 11 is displaced to the one side in the axial direction, and the one-end-side sub seal lip 17 is pressed against the one axial side surface 43a of the mounting groove 43 (the end surface of the one mounting member 41A), and thus the sealing is ensured.

Therefore, whether the inner diameter side of the gasket 11 is under positive pressure or negative pressure, the sealing can be ensured, and thus it is possible to ensure the sealing of both positive pressure and negative pressure even if the dimensional accuracy requirement of the gasket mounting groove 43 is relaxed.

As another aspect of the present embodiment, for example, to prevent the gasket 11 from coming off the gasket mounting groove 43, an interference may be given to the outer periphery of the other-end-side seal lip 16.

The invention claimed is:
1. A positive/negative pressure gasket comprising:
an annular gasket body with a reinforcement ring buried therein, the reinforcement ring having a tubular portion and an annular flat portion extending radially away from the tubular portion, the gasket body configured to be mounted in a gasket mounting groove that opens in a radial direction of a mounting member and is provided with a gap on a groove bottom surface thereof, the tubular portion having a surface that is configured to face the gap that is entirely covered by the annular gasket body;
a flange that is provided to extend from one axial end of the gasket body toward a direction opposite to an opening direction of the mounting member;
a one-end-side seal lip that is provided to extend from the one axial end of the gasket body toward one side in an axial direction and the opening direction of the mounting member, and is configured to come in contact with one axial side surface of the gasket mounting groove when the gasket body is mounted in the gasket mounting groove, an outermost diameter dimension of the one-end-side seal lip is set to be equal to an outer diameter dimension of the annular gasket body that covers the surface of the tubular portion that is configured to face the gap; and
an other-end-side seal lip that is provided to extend from another axial end of the gasket body toward another side in the axial direction and the direction opposite to the opening direction of the mounting member, and is configured to come in contact with another axial side surface and a bottom surface of the gasket mounting groove when the gasket body is mounted in the gasket mounting groove.

2. The positive/negative pressure gasket according to claim 1, wherein the opening direction of the mounting member is a direction toward radially inside.

3. The positive/negative pressure gasket according to claim 1, wherein the opening direction of the mounting member is a direction toward radially outside.

4. The positive/negative pressure gasket according to claim 1, wherein the gasket mounting groove is provided on a hydraulic passage.

5. The positive/negative pressure gasket according to claim 4, wherein the gap serves as a back-side hydraulic passage.

6. The positive/negative pressure gasket according to claim 1, wherein the other-end-side seal lip is configured to contact the bottom surface of the mounting groove such that an interspace is formed between the bottom surface and the annular gasket body.

7. The positive/negative pressure gasket according to claim 6, wherein upon receipt of negative pressure in the interspace, the other-end-side seal lip is configured to deform in a manner that forces the one-end-side seal lip into further contact with the one axial side surface of the gasket mounting groove.

8. A positive/negative pressure gasket comprising:

an annular gasket body with a reinforcement ring buried therein, the gasket body configured to be mounted in a gasket mounting groove that opens in a radial direction of a mounting member and is provided with a gap on a groove bottom surface thereof;

a flange that is provided to extend from one axial end of the gasket body toward a direction opposite to an opening direction of the mounting member;

a one-end-side seal lip that is provided to extend from the one axial end of the gasket body toward one side in an axial direction and the opening direction of the mounting member;

a one-end-side sub seal lip that has a length dimension larger than an axial height dimension of the one-end-side seal lip, and is provided to extend from the flange toward the one side in the axial direction and the direction opposite to the opening direction of the mounting member; and an other-end-side seal lip that is provided to extend from another axial end of the gasket body toward another side in the axial direction and the direction opposite to the opening direction of the mounting member, wherein each of the one-end-side seal lip and one-end-side sub seal lip each extend axially away from the reinforcement ring in the same direction, a terminal end of the one-end-side sub seal lip being located further axially away from the reinforcement ring than a terminal end of the one-end-side seal lip.

9. The positive/negative pressure gasket according to claim 8, wherein the axial height dimension of the one-end-side seal lip is set to be smaller than an axial height dimension of the one-end-side sub seal lip.

10. The positive/negative pressure gasket according to claim 8, wherein the opening direction of the mounting member is a direction toward radially inside.

11. The positive/negative pressure gasket according to claim 8, wherein the opening direction of the mounting member is a direction toward radially outside.

12. The positive-negative pressure gasket according to claim 8, wherein a space is located between the one-end-side seal lip and the one-end-side sub seal lip that is configured to be pressurized upon application of a negative pressure to the gasket body that displaces the gasket body downward in the axial direction.

* * * * *